United States Patent Office 2,758,172
Patented Aug. 7, 1956

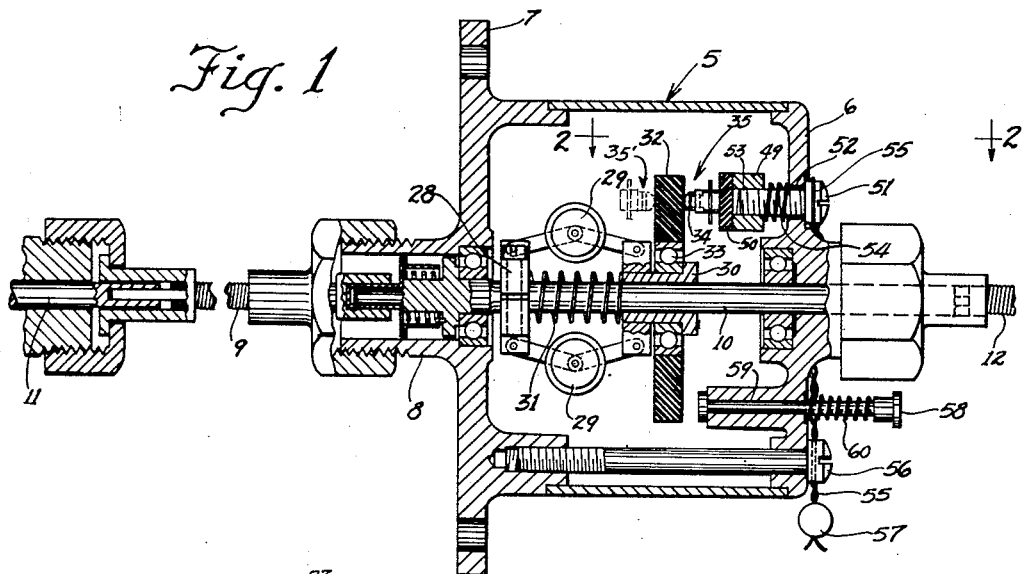

2,758,172

VEHICLE SPEED SIGNAL DEVICE

Edward J. Kromholz, Rockford, Ill.

Application August 6, 1951, Serial No. 240,460

7 Claims. (Cl. 200—80)

This invention relates to motor vehicle speed light signal devices for use on automobiles, trucks, buses, motorcycles, and other power driven and power propelled types of vehicles running on city streets and public highways.

Devices of this kind present a difficult problem, first of all from the standpoint of signalling just enough for the desired effect but not enough to cause confusion, and, in cases where there are several signal lights, the further difficulty arises of keeping the signals clean-cut and free from the flashing of signal lights on and off when critical speeds are reached. Sliding brush type contactors have commonly been employed in these devices, and with such structures any slight amount of reciprocation of the flyweight actuated member that operates the slidable brush relative to closely spaced insulated contacts was apt to cause objectionable flickering of signal lights. There was also a tendency with that kind of construction to provide more signal lights than were really necessary, and the large number of signal lights caused confusion, thus greatly reducing the likelihood of such speed signals being adopted by lawmaking bodies and specified for compulsory use on all automobiles, trucks, buses, motorcycles, and other power propelled vehicles operated in and under their jurisdictions.

According to my invention, a single switch is used and is closed automatically when the city's or town's twenty-five mile per hour speed limit is exceeded, thereby lighting a "give-away" signal outside and a warning signal inside and visible to the operator of the motor vehicle or motorcycle. However, the invention is not so limited, being applicable also where a further signal is desired for indicating unlawful speeds on highways, say, over fifty miles per hour, for which purpose an additional switch may be provided, arranged to be closed automatically when that higher speed limit is exceeded, lighting a suitable "give-away" signal on the outside and warning signal inside and visible to the operator of the motor vehicle or motorcycle. With either arrangement a minimum number of lights is used, making the signalling most effective and avoiding confusion, so that more reliance can be placed in this device by law enforcement officers and others interested in the promotion of highway safety, not only from the standpoint of the effectiveness of the device as a speed signal, but also as a deterrent to speeding and reckless driving.

It is furthermore, an object of my invention to provide a vehicle speed signal light device utilizing a double-throw snap-action switch which is positive in its operation, and when disposed in either of its limit positions, keeps one signal light on until there is an appreciable change in speed, sufficient to cause snap-action to the other extreme, thereby avoiding the objectionable flickering of lights on and off.

Another object of the invention is to provide a signal device in combination with two filament light bulbs so connected with the electrical wiring for the headlights that when the light switch is in the "off" position for daytime driving, the high candle power filament is automatically connected in the circuit, and, when the light switch is turned on for nighttime driving, when, of course, there is no question as to the light being visible, the low candle power filament is used.

Another object is to provide a blinker relay in the circuit for whichever signal light or lights require the blinking on and off of the light, for greater effectiveness. For example, in the case of a signal device having a steady-burning purple light as a "give-away" signal when a city or town speed limit of say twenty-five per hour speed limit is exceeded, the blinker relay might be provided only in connection with the purple light when the speed of the vehicle exceeds the highway speed limit of say fifty miles per hour. In other words, it is the object of my invention to provide a more effective vehicle speed light signal device, one designed to avoid the various objections mentioned above, and to recognize and incorporate the use of an entirely new approach to legislative requirements designed to curb and bring under control speeding and reckless driving.

The invention is illustrated in the accompanying drawing, wherein—

Fig. 1 is a longitudinal section through a vehicle speed signal device made in accordance with my invention;

Fig. 2 is a sectional detail on line 2—2 of Fig. 1, including an electrical circuit diagram, and Fig. 3 is a side view of the rear portion of an automobile showing how the give-away signal lights may be provided as a built-in portion of the car body, or on an attached bracket.

The same reference numerals are applied to corresponding parts in these three views.

Referring to the drawing, the reference numeral 5 designates the speed signal device generally. The housing 6 thereof has an attaching or supporting flange 7 for bolted connection with the dash of an automobile, but it will be understood the invention is applicable also to a truck, bus, motorcycle, or other motor vehicle. A hollow neck 8 on one end is adapted to project through a hole in the dash, and a flexible shaft 9 extending from this neck provides a detachable driving connection between the central or "governor" shaft 10 in the signal device and the usual speedometer drive shaft 11 provided on the vehicle, from which the flexible speedometer drive shaft 12 has been disconnected to permit this connection. The shaft 12 is then connected to the other end of shaft 10, as indicated, so that the governor shaft of the signal device is driven at the same speed as the governor shaft of the vehicle's speedometer, the dial of which appears diagrammatically at 13 on the vehicle's instrument board 14. In addition to the usual lights on the front and rear ends of the vehicle and such lights as may be provided on the instrument board, I prefer to provide two "give-away" signal lights 15 and 16 on the rear end of the vehicle and a telltale signal light 17 on the instrument board 14 of the vehicle, the light 15 illuminating an amber colored lens 18 at speeds up to say twenty-five miles per hour, and the light 16 illuminating a purple colored lens 19 at speeds upwards from say twenty-five miles per hour, that being a widely adopted speed limit for city driving. The telltale light 17 preferably is on only when light 16 is on, thereby warning the driver when he or she is exceeding the speed limit, in addition to letting the driver known that the signal device is functioning properly. Of course I may provide a second telltale light on the dash that will be on when light 15 is on. That second telltale light could be of a smaller candle power or of a different color, to distinguish it from the telltale light 17, the same as is done, for example, with headlight telltale lights where white is used for the normal driving light, with deflected beam, and red is used to indicate when the bright lights are turned on. If a blinker relay is interposed, as indicated diagrammatically at 20 in the line 21 for light 16, it is obvious that when the circuit through the light 16 is closed, lights 16 and 17 will blink on and off like direction turn signal lights, thus making the give-away signal and the warning signal much more effective. Furthermore, if the bulb 16 is a two-filament bulb, thus requiring a third wire for that bulb, as indicated in dotted lines at 22, and if the circuit for that bulb is connected with the switch 23 that is provided on the instrument panel 14 and controls the headlights, it will further appear that when this switch is in the "off" position for daytime driving, the high candle power filament 24 of bulb 16 is connected in circuit for brighter illumination and more effective signalling during such adverse conditions, whereas, when the switch 23 is moved to its other position to turn on the headlights for nighttime driving the lower candle power filament 25 of bulb 16 is connected in circuit, furnishing sufficient illumination for effective signalling under those conditions. It is apparent, therefore, that my invention overcomes the objections that have heretofore been raised in regard to the ineffectiveness of speed signal lights as heretofore devised and should therefore be of interest to automobile, truck, bus and motorcycle manufacturers, and also merit the approval of lawmaking bodies to be specified for compulsory use on all motor vehicles licensed for operation on the highways and in cities in their jurisdictions.

Referring now more specifically to the speed signal device 5, the reference numeral 28 designates a collar secured to the governor shaft 10 and having connected therewith the flyweights 29 which in turn are connected with another collar 30 that is reciprocable on the shaft toward and away from the collar 28, a coiled compression spring 31 being disposed between the two collars and encircling the shaft tending normally to urge the collars apart and accordingly resist the outward movement of the flyweights under centrifugal force and return them to the low speed position in which they are shown. A slip ring 32 is mounted on an anti-friction bearing 33 on the collar 30 and is arranged to operate the movable arm 34 of a double-throw snap-action switch indicated generally by the reference numeral 35 and best illustrated in Fig. 2. A switch of this kind is disclosed in Eaton Patent #2,170,748 and McGall Patent #1,960,020. It consists briefly of leaf spring 36 supported at one end 37 on the movable end of the rocker type lever 34 and having its free end normally in engagement with a terminal 38, the leaf spring 36 being biased normally in that direction by the bowed middle portion 39 of the leaf spring 36, this bowed portion having abutment at its free end on a bracket 40 that also serves as the fulcrum for the rocker type lever 34. The lever 34 normally tends to lie in the position indicated in dotted lines in Fig. 2, but at low speeds below twenty-five miles per hour the slip ring 32 holds the lever 34 in the full line position shown in Fig. 2 wherein the leaf spring 36 has engagement with contact 41. Under those conditions, as indicated by the conductor 42 connected with contact 41, the low speed signal light 15 is on, the circuit being completed through the signal light 15 by conductors 43 and 44 to one side of the battery 45 and to ground. The switch 35 has a common ground connection 46 for both contacts 38 and 41. As soon as the slip ring 32 has backed away from the lever 34 far enough to move the connected end of leaf spring 36 to the other side of a dead center with respect to the fulcrum end of the bowed portion 39 on bracket 40, leaf spring 36 snaps to its other extreme position, which is its normal position, in engagement with contact 38. That occurs when a speed above twenty-five miles per hour is attained, and when that occurs the give-away signal light 16 goes on and likewise the telltale light 17. It is important to note in this connection that there is no likelihood whatsoever of the lights 15 and 16 flickering on and off at or near the critical speed; the snap-action of the switch 35 absolutely prohibits such operation and insures having one light stay on until the spring 36 is moved past a dead center position, whereupon the spring 36 snaps to its other limit position and turns the other light on. With a sliding brush type contactor such operation is, of course, impossible, and it is very difficult, if not impossible to avoid the objectionable flickering.

Now, it should be apparent that between say twenty-six miles per hour and say fifty miles per hour the slip ring 32 is free to turn with the flyweights, and, therefore, there is no wear and tear on any part of the signal device. At speeds below twenty-five miles per hour the slip ring 32 engages the switch actuating lever 34 and may turn with respect to said lever to some extent, assuming the friction of its engagement on the end of lever 34 exceeds the friction in the anti-friction bearing 33, but in any event the wear is negligible because slip ring 32 may be provided of a graphite impregnated material, if desired, or of the well-known oilrite, or of a plastic material, as indicated, the latter having the advantage that it is a non-conductor and therefore no problem of insulation is involved.

The switch 35, as indicated in Fig. 1, is mounted on one end wall of the housing 6 for adjustment toward and away from the slip ring 32, there being two parallel guide posts 47 projecting from the end wall of the housing which are slidably received with a close working fit in holes 48 in opposite ends of a plate 49 onto which the insulation base plate 50 of the switch 35 is suitably secured. A screw 51, which extends freely through a hole 52 in the end wall of the housing and is threadedly received in a hole 53 provided in the plate 49 midway between the guides 48, has a coiled compression spring 54 mounted thereon between the end wall of the housing and the plate 49 urging the switch assembly inwardly to its fullest possible extent, so that if the screw 51 is loosened the switch 35 is advanced toward the slip ring 32 and if the screw 51 is tightened the switch 35 is retracted with respect to slip ring 32, thereby enabling setting of the signal device to turn on the signal light 16 at a lower or higher speed depending upon the speed limit in a given locality for which the signal device is to be set.

In order to prevent unauthorized manipulation of the adjusting screw 51 and at the same time prevent unauthorized opening of the housing of the signal device, a wire 55 is passed through holes in the heads of a plurality of screws 56 that fasten the end plates of the housing 6 together, and this same wire extends through a hole in the head of the adjusting screw 51, as shown and a seal 57, which is applied either at the time of manufacture, or may be applied by a duly authorized official in the state or municipality concerned, this serving to indicate at once to an arresting officer if the device or its adjusting screw 51 has been tampered with, and, of course, a suitable penalty may be attached to such offence.

At 58 is indicated a testing plunger slidable in guide 59 on the end plate of the housing diametrically opposite from the adjusting screw 51. This plunger is normally held in the retracted position shown by means of a coiled compression spring 60 but may be pushed in against the action of this spring to move the slip ring 32 away from the switch 35, thus enabling one to test easily to determine by noting whether the give-away signal lights 15 and 16 are turned on and off in the proper relationship to one another whether the device is in good working order, without having to run the car for that purpose.

As indicated above and shown in dotted lines in Fig. 1 at 35', I may provide on the opposite side of the slip ring 32 from the switch 35 another single throw or double throw snap-action switch arranged to be operated when the vehicle exceeds a predetermined high speed limit of say fifty miles per hour, the lever 34 of that switch being normally in its one limit position engaging contact 38 which may be connected in series with the give-away signal light 16 so that so long as the slip ring 32 has not reach the second snap switch the give-away signal light 16 for the lower speed limit will be on but as soon as the higher speed limit has been exceeded and slip ring 32 snaps the second switch to its other limit position where it engages contact 41, the give-away signal light 16 will be turned off and the third give-away signal light associated with lens 26 will be turned on. The aim, in other words, is to keep operating with the minimum number of signal lights so as to avoid the confusion that would otherwise be created with too many signal lights. From that standpoint it is entirely possible that the low speed signal light 15 which is not intended strictly as a give-away signal light but only to show that the signal device is functioning, may be dispensed with, in which event the circuit above described would be revamped to use one of two give-away signal lights to indicate when the low speed limit is exceeded and use the other give-away signal light to indicate when the high speed limit is exceeded. That would further tend to eliminate confusion because then the low speed give-away signal could be of one color and the high speed light could be of another color, both easily distinguishable from the red lights now commonly provided as rear tail lights and stop signal lights.

It is believed the foregoing description conveys a good understanding of the objects and advantages of my invention. The appended claims have been drawn to cover all legitimate modifications and adaptations.

I claim:

1. In a device of the character described, the combination of a housing, a speed shaft rotatable therein, speed-responsive means turning with the shaft, a slip-ring mounted on a bearing on that part of said speed-responsive means movable back and forth in response to speed change, a switch operatively engageable by said slip-ring, manually operable means for shifting the switch relative to the slip-ring to advance or retard its operation thereby, and a seal for holding said means in adjusted position to prevent unauthorized change in the adjustment.

2. In a device of the character described, the combination of a housing, a speed shaft rotatable therein, speed-responsive means turning with the shaft, a slip-ring mounted on a bearing on that part of said speed-responsive means movable back and forth in response to speed change, a switch operatively engageable by said slip-ring, and manually operable means for moving the slip ring to and fro independently of operation of the speed responsive means and rotation of the shaft, whereby to test operation of the switch.

3. In a device of the character described, the combination of ahousing, a speed shaft rotatable therein, speed-responsive means turning with the shaft, a slip-ring mounted on a bearing on that part of said speed-responsive means movable back and forth in response to speed change, a switch operatively engageable by said slip-ring, manually operable means for moving the slip ring to and fro independently of operation of the speed responsive means and rotation of the shaft, whereby to test operation of the switch, and spring means normally urging said manually operable means to retracted position relative to said slip-ring.

4. In a device of the character described, the combination of a housing, a speed shaft rotatable therein, speed responsive means turning with the shaft, a slip-ring mounted on that part of said speed responsive means that is movable back and forth in response to speed change, two snap-action switches mounted in the housing at opposite extremes relative to the movement of said slip-ring, each having an actuating arm normally spring biased on one side of dead center to one liimt position but arranged to be engaged by said slip-ring and moved over dead center to the other limit position, and manually operable means for shifting at least one of said switches relative to the slip-ring independently of the other of said switches to advance or retard the operation of the switch so shifted.

5. In a device of the character described, the combination of a housing, a speed shaft rotatable therein, speed-responsive means turning with the shaft, a snap-action switch mounted in the housing and having an actuating arm normally spring biased on one side of dead-center to one limit position, said arm being arranged to be engaged by said speed-responsive means and moved over dead-center to the other limit position, an adjustable support for the switch, guide pins on which the support is adjustable relative to the housing, spring means normally urging the support toward the speed-responsive means, and a manually adjustable screw adjustable from outside the housing and threaded in the support, whereby the switch is adapted to be adjusted relative to the speed-responsive means to advance or retard its operation thereby.

6. In a device of the character described, the combination of a housing, a speed shaft rotatable therein, speed-responsive means turning with the shaft, a snap-action switch mounted in the housing and having an actuating arm normally spring biased on one side of dead-center to one limit position, said arm being arranged to be engaged by said speed-responsive means and moved over dead-center to the other limit position, an adjustable support for the switch, guide pins on which the support is adjustable relative to the housing, a coiled compression spring caged between a portion of the housing and said support tending to urge the switch normally toward the speed-responsive means, and a manually adjustable screw adjustable from outside the housing extending through said spring and serving as a supporting guide therefor and threaded in said support to advance or retard the operation of the switch in relation to the operation of the speed-responsive means.

7. In a device of the chaarcter described, the combination of a housing, a speed shaft rotatable therein, speed responsive means turning with the shaft, a slip-ring mounted on that part of said speed responsive means that is movable back and forth in response to speed change, and two snap-action switches mounted in the housing at opposite extremes relative to the movement of said slip-ring, each having an actuating arm normally spring biased on one side of dead center to one limit position but arranged to be engaged by said slip-ring and moved over dead center to the other limit position.

References Cited in the file of this patent

UNITED STATES PATENTS

| | | |
|---|---|---|
| 2,079,539 | White | May 4, 1937 |
| 2,128,841 | Moore | Aug. 30, 1938 |
| 2,234,309 | Kromholz | Mar. 11, 1941 |
| 2,250,587 | Larsons | July 29, 1941 |
| 2,307,151 | Moore | Jan. 5, 1943 |
| 2,418,373 | Spaller | Apr. 1, 1947 |
| 2,463,357 | Clark | Mar. 1, 1949 |
| 2,496,169 | Lochman | Jan. 31, 1950 |
| 2,543,877 | Stein | Mar. 6, 1951 |
| 2,555,703 | Restemeier | June 5, 1951 |
| 2,610,314 | Morse | Sept. 9, 1952 |
| 2,628,294 | Bone | Feb. 10, 1953 |
| 2,677,539 | Winslow | May 4, 1954 |